No. 817,329. PATENTED APR. 10, 1906.
W. & J. Y. MIDDLETON.
TERMINAL OR COUPLING FOR ELECTRIC CABLES.
APPLICATION FILED JUNE 5, 1905.

UNITED STATES PATENT OFFICE.

WILLIAM MIDDLETON AND JOHN YULE MIDDLETON, OF NEWCASTLE-UPON-TYNE, ENGLAND.

TERMINAL OR COUPLING FOR ELECTRIC CABLES.

No. 817,329.     Specification of Letters Patent.     Patented April 10, 1906.

Application filed June 5, 1905. Serial No. 263,846.

*To all whom it may concern:*

Be it known that we, WILLIAM MIDDLETON and JOHN YULE MIDDLETON, subjects of the King of England, and residents of Newcastle-upon-Tyne, in the county of Northumberland, England, have invented certain new and useful Improvements in Terminals or Couplings for Electric Cables, of which the following is a specification.

This invention relates to improvements in terminals or couplings for electric cables; and the object is to enable a cable or cables to be quickly and firmly connected without soldering or the like. To this end the coupling comprises two or more disks connected together and provided with annular grooves adapted to inclose the cables, part of the walls of said grooves being cut away for facilitating passage of the cables.

Figure 1:
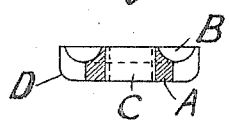
Figure 2:
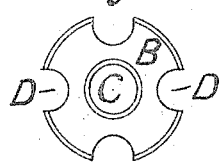
Figure 3:
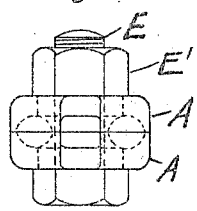
Figure 4:
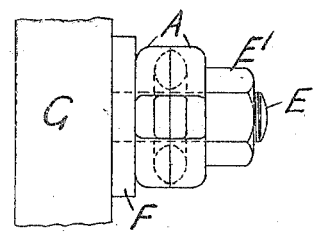
Figure 5:
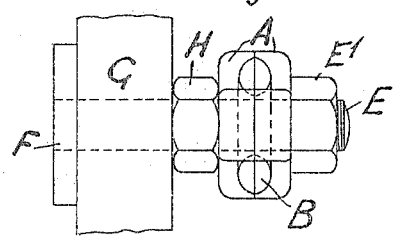
Figure 6:
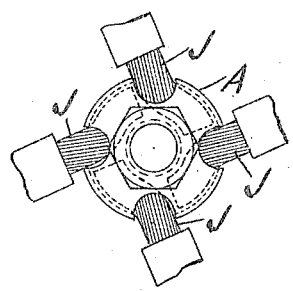

Referring to the annexed drawings, Figure 1 is a sectional elevation of a disk forming part of the coupling. Fig. 2 is a plan thereof; Fig. 3, an elevation of the complete coupling. Fig. 4 shows the coupling as a terminal fixed to a bus-bar on a switchboard. Fig. 5 shows the coupling as a terminal on the back of a switchboard and connected to the bus-bar in front, and Fig. 6 shows a coupling with four cables.

The improved terminal or coupling consists of two disks A, of suitable thickness, and made of brass, gun-metal, copper, or other suitable material. The two disks are connected together by a bolt or the like E passing through a hole C in the centers of said disks and furnished with a nut E'. A groove B of suitable width and depth is provided on the inner face of each disk and in which the cable or cables J lie. The outer walls of the grooves are cut away in two or more places at D, so that the cable or cables can be passed easily in or out without unnecessary bending. The parts of the walls left standing serve as guides for keeping the cable in place. Two or more terminals may be on one connecting-bolt E, each constructed as above described.

Fig. 4 shows the coupling used as a terminal and connected to the bus-bar F of a switchboard G, and Fig. 5 shows the coupling similarly used, but connected to the back of the board, the bolt E passing through the board to the bus-bar F and a nut H being used between the coupling and board for securing the bus-bar to said board. With this form of coupling two or more cables can be quickly and firmly connected together without soldering or other means generally used at present.

What we claim as our invention is—

A coupling for electric cables comprising a plurality of disks having their inner or adjacent faces each provided with an annular groove for reception of the cable or cables, said groove having parts of its outer wall cut away, and means for connecting said disks together substantially as described.

In witness whereof we have signed this specification in the presence of two witnesses.

WILLIAM MIDDLETON.
    JOHN YULE MIDDLETON.

Witnesses:
    W. CATTO,
    HENRY TURNER.